Figure 1:
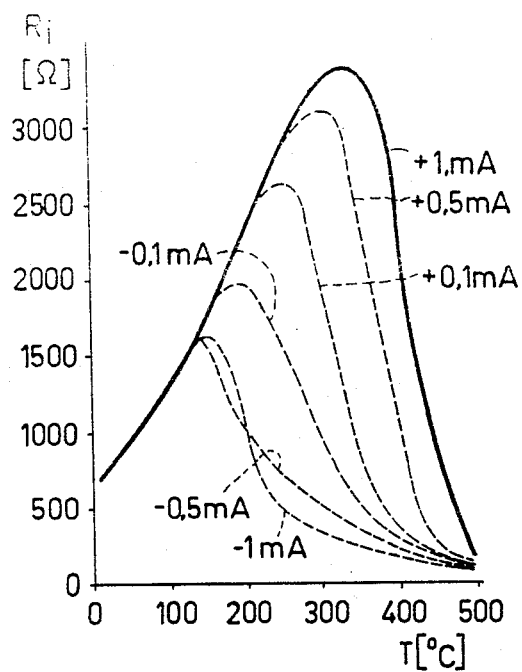

United States Patent [19]

Begehr et al.

[11] Patent Number: 4,830,514
[45] Date of Patent: May 16, 1989

[54] TEMPERATURE MEASURING ARRANGEMENT

[75] Inventors: Dieter Begehr, Oststeinbek; Gerd Keitel, Ahrensburg; Rainer Burmeister, Hamburg, all of Fed. Rep. of Germany

[73] Assignee: U.S. Philips Corp., New York, N.Y.

[21] Appl. No.: 432,879

[22] Filed: Oct. 5, 1982

[30] Foreign Application Priority Data

Oct. 5, 1981 [DE] Fed. Rep. of Germany ....... 3139556

[51] Int. Cl.$^4$ .................... G01K 7/16; H01L 35/00
[52] U.S. Cl. .................... 374/178; 307/310; 357/28
[58] Field of Search .......... 374/178; 307/310; 357/28; 324/158 D; 338/25

[56] References Cited

U.S. PATENT DOCUMENTS

| | | | |
|---|---|---|---|
| 2,054,836 | 9/1936 | Sheppard, Jr. | 356/226 |
| 3,051,815 | 8/1962 | Hukee et al. | 307/310 X |
| 3,079,562 | 2/1963 | Elliott | 307/310 X |
| 3,142,987 | 8/1964 | Dowling et al. | 374/178 |
| 3,420,104 | 1/1969 | Troemel et al. | 374/178 |
| 3,987,318 | 10/1976 | Meijer | 357/28 X |
| 4,047,436 | 9/1977 | Bernard et al. | 338/25 X |
| 4,071,813 | 1/1978 | Dobkin | 374/178 X |
| 4,229,753 | 10/1980 | Bergeron | 357/28 |

FOREIGN PATENT DOCUMENTS

| | | | |
|---|---|---|---|
| 0028387 | 10/1980 | European Pat. Off. | 357/28 |
| 1253855 | 11/1967 | Fed. Rep. of Germany. | |
| 2826225 | 12/1979 | Fed. Rep. of Germany | 374/178 |
| 3041818 | 6/1982 | Fed. Rep. of Germany. | |

OTHER PUBLICATIONS

"Sensoren fur die Automobil—Elektronik", Josef Schurmann, Funkschau 1978, Heft, 14, (pp. 89–92 or pp. 679–682).

Primary Examiner—Daniel M. Yasich
Attorney, Agent, or Firm—Bernard Franzblau

[57] ABSTRACT

A temperature measuring arrangement employs a semiconductor element whose internal resistance depends on the temperature and the current direction and which is driven by an a.c. signal from an a.c. signal source. A measuring device determines the difference in semiconductor element conductivity depending on the polarity of the applied a.c. signal to provide an indication of the temperature being measured.

24 Claims, 2 Drawing Sheets

TEMPERATURE MEASURING ARRANGEMENT

The invention relates to a temperature measuring arrangement comprising a semiconductor element whose conductivity is temperature-dependent. This element is provided with a planar electrode and, on the opposite side, a substantially point-shaped electrode and has a threshold temperature above which its conductivity depends on the current direction. The arrangement also includes a signal source connected to the electrodes and a measuring device.

Semiconductor elements whose temperature-dependent resistance is utilized for the electronic measurement of temperatures are known. There are semiconductor elements which operate in accordance with the radial spreading resistance principle. Basically they comprise a semiconductor crystal provided with a planar electrode on one surface and a very small electrode on a further, opposite, surface. The current distribution between the two electrodes is approximately conical, which largely eliminates the effect of tolerances in the crystal dimensions on the internal resistance of the semiconductor element. Further, this arrangement precludes current variations as a result of surface effects in the crystal. In comparison with the customary NTC sensor elements the measuring error in the case of semiconductor elements which operate in accordance with the radial spreading resistance principle is substantially smaller.

However, these semiconductor elements have two great disadvantages. Firstly, their range of operation towards higher temperatures is limited because, as a result of the occurrence of intrinsic conduction, the internal resistance of the semiconductor element, which increases at increasing temperature in the extrinsic-conduction range, decreases again when intrinsic conduction commences. Secondly, as a result of the substantial difference in electrode area the internal resistance of the semiconductor element depends on the direction of current flow. This dependence of the internal resistance on the current direction increases substantially when intrinsic conduction starts.

European Patent Application No. EP 00 28 387 (hereby incorporated by reference) describes a temperature sensor comprising a semiconductor body whose upper side is provided with at least two metal contacts and whose surface which is remote from the upper side is provided with a metal coating. In such a semiconductor element the metal contacts on the upper side are used as connections. The current propagation lines extend from one metal contact through the semiconductor body to the metal coating and from the metal coating through the semiconductor body back to the other metal contact. This means that the current propagation lines extend through the semiconductor body in both directions, which reduces the dependence of the internal resistance of the semiconductor body on the current direction, cf. FIG. 5 of the said application. However, in this case too the asymmetry of the resistance, and consequently the measurement error, increases substantially when intrinsic conduction begins.

German Patent Application No. 30 41 818 describes a semiconductor device for temperatures above the point where intrinsic conduction begins. This device comprises a semiconductor body provided with two electrodes of substantially different surface areas. Moreover, the magnitude and direction of the current which flows through the semiconductor device are selected so that in the semiconductor body an electric field strength distribution is obtained such that substantially all minority charge carriers are carried off to the electrode connected to the negative potential. Consequently, a corresponding amount of majority charge carriers are retained in the semiconductor body, thereby largely cancelling the intrinsic-conduction effect. For this polarity the intrinsic conduction begins at a substantially higher temperature so that the range in which the extrinsic conduction is predominant is extended towards higher temperatures. In this range the resistance characteristic of the semiconductor element rises further with the temperature and the measurement range of the semiconductor device is extended towards higher temperatures.

In such a semiconductor device the substantial dependence of the resistance characteristic on the current direction is again a disadvantage, in particular in the upper part of the temperature measurement range.

Known temperature sensors of the types described have internal resistances in the range from some 100 ohms up to some kilo-ohms and are therefore suitable for use in the customary measuring and signal-processing semiconductor circuits. In the known circuit arrangements they are always operated with a direct voltage or a direct current. With this method of operation the dependence of the internal resistance on the current direction gives rise to measurement errors and restricts the possibilities as regards the circuit design. The temperature sensor described in European Patent Application No. EP 0 028 387 does not entirely eliminate these disadvantages. The dependence of the internal resistance on the current direction is smaller only in the temperature range below the point where the intrinsic conduction begins, but the semiconductor body is substantially larger despite the simple arrangement. This special design not only gives rise to a higher thermal inertia of the semiconductor element, but it also results in a casing construction which is not suitable for all purposes.

It is an object of the present invention to provide a simple, accurately operating and low-cost measuring arrangement having a high measurement sensitivity even at temperatures at which the semiconductor element is already in its intrinsic conduction region where its conductivity depends on the current direction.

According to the invention this object is achieved in that in a circuit arrangement of the type mentioned in the opening paragraph the signal source is an alternating-current or alternating-voltage source and the measuring device determines the difference in semiconductor conductivity, and consequently the temperature of the semiconductor, depending on the polarity of the applied signal.

The alternating electric signal from the signal source suitably has a waveform which is at least substantially symmetrical relative to the zero point.

In a further embodiment of the invention the circuit arrangement comprises a signal source which impresses an alternating current on the semiconductor element and a measuring device which detects the voltage produced across the semiconductor element as a result of the impressed alternating current. Alternatively, the circuit arrangement may comprise a signal source which impresses an alternating voltage on the semiconductor element and a measuring device which detects the resulting current in the semiconductor element.

In a further embodiment of the invention the semiconductor element is arranged in series with an impedance, preferably a capacitance, and the signal source is connected to this series arrangement, the measuring device being arranged in parallel with the impedance.

The circuit arrangement in accordance with the invention utilizes a semiconductor element of a material which preferably has a high-impedance and whose doping concentration lies substantially in the range from $10^{13}$ to $10^{16}$ doping atoms/cm$^3$. In such a material two current conduction mechanisms are active in the temperature range which is most interesting for the present use: extrinsic conduction with impurity depletion and intrinsic conduction. At lower temperatures the extrinsic conduction is predominant because the conductivity of the semiconductor material depends only on the charge-carrier mobility, which decreases as the temperature increases. As a result of this the specific resistance of the material increases at increasing temperature. At higher temperatures the intrinsic conduction becomes dominant because the charge-carrier density increases at increasing temperature. As a result the specific resistance of the semiconductor material diminishes at increasing temperature.

For the specified doping concentrations, for example, silicon exhibits the behaviour described in the foregoing in the temperature range from approximately $-200°$ C. to approximately $+800°$ C., the transition between the range of extrinsic conduction and the range of intrinsic conduction lying between approximately $+100°$ C. and approximately $+300°$ C. depending on the doping concentration.

The resistance as a result of the intrinsic conduction, however, can be obtained only if the connection areas underneath the electrodes produce a sufficient amount of charge carriers. This charge carrier production depends on the charge-carrier generation rate in the semiconductor material and on the electrode area. The charge carrier generation rate increases as the temperature increases. On the other hand, for a larger current through the semiconductor element a higher generation rate is required than for a small current. For the semiconductor element with different size electrodes used in the present case this results in a variation of the internal resistance as a function of the temperature, which depends on the current direction, while in addition the resistance variations increase at increasing current through the semiconductor element.

In all known circuit arrangements for temperature measurement by means of a semiconductor element operating in accordance with the radial spreading resistance principle, the extrinsic conduction range is utilized as the measurement range. The current-direction dependence of the internal resistance, which already occurs to a small extent in the extrinsic-conduction range, then limits the range in which the semiconductor elements can be used and their measurement accuracy. In accordance with the invention use is made of this difference in internal resistance of the semiconductor element for different current directions in order to obtain a measurement value. To ensure an unambiguous relationship between the temperature and the electrical measurement quantity detected by the measuring device, the characteristics of the internal resistance in the two current directions should have different slopes, i.e., the temperature coefficient of the semiconductor element is current-direction dependent. Specifically, the sign of the temperature coefficient is also current-direction dependent. Since the current-direction dependence of the internal resistance in the extrinsic-conduction range is small and only provides a useful measurement signal at the point where the intrinsic conduction starts, its variation as a function of the temperature exhibits a distinct threshold value. The threshold temperature depends on the doping concentration of the semiconductor element and can moreover be shifted by the use of currents of different values in the semiconductor element.

In principle an alternating electric signal of arbitrary waveform and frequency may be used in order to evaluate the current-direction dependence of the internal resistance. An at least approximately symmetrical waveform, for example a sinewave, a square-wave or a triangular wave, greatly simplifies the evaluation of the measuring signal.

Measuring arrangements which utilise alternating voltage sources in order to energize a light-sensitive element for measuring or detecting light are known per se. However, the element acts as a rectifier and has a blocking state in which light does not contribute to the measurement value. In the circuit arrangement in accordance with the invention temperatures are measured above a threshold value where the conductivity becomes dependent on the current direction. An example of a light-measuring arrangement is described in U.S. Pat. No. 2,054,836.

The invention has the advantage that it provides a circuit arrangement which enables accurate temperature measurements to be made in the intrinsic-conduction range of the semiconductor element which is used. Thus, the operating range for temperature-measuring elements which operate in accordance with the radial spreading resistance principle is extended substantially towards higher temperatures, for example in the case of an N-doped silicon semiconductor element of conventional design it extends from approximately 150° C. to over 300° C. Furthermore, another advantage is that the variation of the signal detected by the measuring device as a function of the temperature is greater than the temperature coefficient of the semiconductor element when driven in the customary manner by a direct voltage or a direct current. Moreover, for many uses the threshold characteristic of the measurement signal is of advantage, cf. Funkschau 1978, vol. 14, pages 679–682. The invention thus provides a temperature-measuring arrangement using a simple semiconductor element with simple additional circuitry, which arrangement operates accurately, is easy to adjust and consequently provides an inexpensive solution for measuring tasks in mass-manufactured products, for example in automotive products, domestic appliances, etc. Because of the narrow tolerances within which the semiconductor elements can be manufactured cheaply, the circuit arrangement need not be adjusted if less stringent requirements are imposed on the measurement accuracy.

Figure 2:
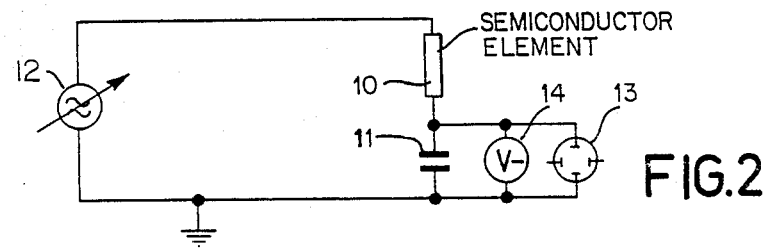
Figure 3:
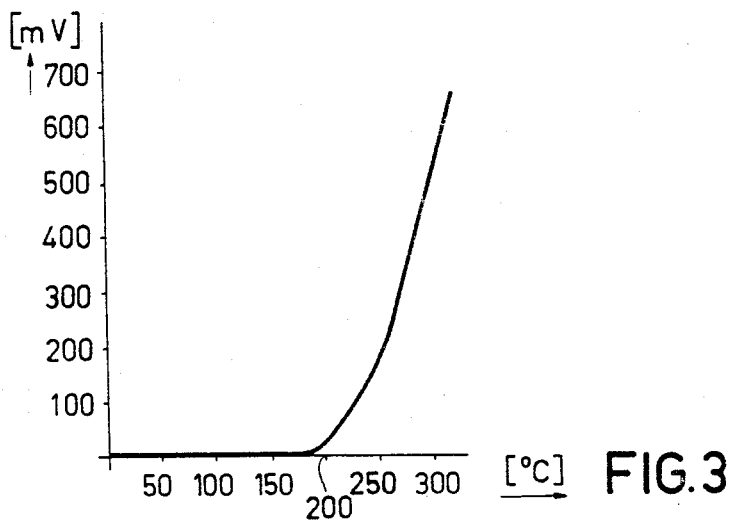

The invention will now be described in more detail by way of example, with reference to the drawings. In the drawings:

FIG. 1 represents the temperature-dependent internal resistance of a semiconductor element used in a circuit arrangement in accordance with the invention for the two current directions with the current represented as the parameter, FIG. 2 is a circuit diagram representing the principle of a circuit arrangement in accordance with the invention, and FIG. 3 represents the voltage reading on the measuring instrument V as a function of the temperature.

Figure 4:
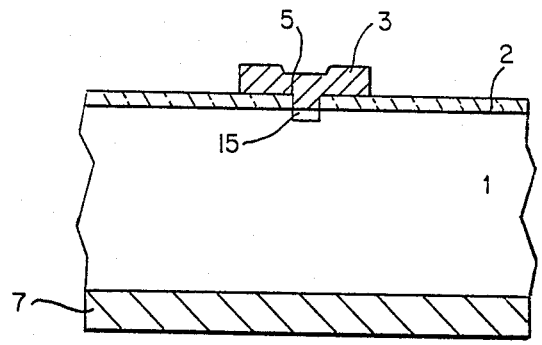

FIG. 4 shows an example of a prior art semiconductor element which can be used in the invention.

FIG. 1 shows the variation of the internal resistance as a function of the temperature, as already described. The left-hand rising portion of the curve represents the extrinsic-conduction range. Depending on the magnitude and direction of the current the intrinsic conduction begins at different temperatures and the internal resistance decreases at increasing temperature. It can be seen that the current-direction dependent differences in internal resistance increase at increasing current and also that the temperatures at which iintrinsic conduction starts for the instantaneous current directions always differ substantially from each other at increasing current. Thus it is posible to adjust the measurement range and sensitivity of the circuit arrangement directly by means of the current, e.g., the circuit may include means for adjusting (or setting) the AC signal amplitude applied to the semiconductor element to a level so as to drive it into its intrinsic conduction region for at least a part of the temperature range to be measured.

FIG. 2 is a diagram representing the principle of a circuit arrangement in accordance with the invention. A series arrangement of a temperature-dependent semiconductor element 10 and a capacitance 11 is connected to the output terminals of an AC generator 12 which supplies a sinewave voltage. A variable AC generator may be used in order to adjust or set the current level for the semiconductor element. An oscilloscope 13 and a voltmeter 14 are arranged in parallel with the capacitance. The voltmeter indicates the arithmetic mean of the voltage across the capacitance, i.e. its d.c. component. The two lead wires provide a means for coupling the AC signal source 12 to the electrodes of the semiconductor element 10.

FIG. 3 shows the variation of the direct voltage as a function of the temperature of the semiconductor element. In the extrinsic-conduction range, in which the internal resistance of the semiconductor element is independent of the current direction except for minor deviations, the voltage drop across the capacitance is sinusoidal without a d.c. component. At the point where the intrinsic conduction begins, towards higher temperatures, the current-direction dependence of the resistance gives rise to a distortion of the voltage across the capacitance and a d.c. component is produced which rapidly increases as the temperature increases. In effect, the semiconductor element 10 "rectifies" the AC current because its resistance is different depending on the direction of current flowing therein, and this difference in resistance is temperature dependent.

The circuit arrangement described with reference to FIG. 2 has been built, by way of example, using the following components.

The AC generator supplied a sinewave voltage having a peak value of 1.8 V and a frequency of 500 Hz at its output terminals. The temperature-dependent semiconductor element was a, type KTY 83 manufactured by Valvo. The capacitance was 4.7 μF.

The semiconductor element 10 in FIG. 2 may consist of a semiconductor body 1 (FIG. 4) having a planar electrode 7 on one side thereof. On the other side of the body 1 is an insulation layer 2 with an aperture 5. A metal electrode 3 communicates with the semiconductor 1 via the aperture and a doped zone 15. The electrodes 3 and 7 may be connected to one terminal of the AC generator and to one terminal of the capacitor 11, respectively, in the circuit of FIG. 2.

What is claimed is:

1. A circuit arrangement for measuring temperature comprising: a semiconductor element whose conductivity is temperature-dependent, said semiconductor element including a planar electrode and, on the opposite side, a substantially point-shaped electrode and having a threshold temperature above which its conductivity depends on the current direction, means for coupling an AC signal source to the electrodes of the semiconductor element, and a measuring device connected in circuit with the semiconductor element so as to determine the difference in semiconductor conductivity, and consequently the temperature of the semiconductor element, depending on the direction of current flow of the applied AC signal.

2. A circuit arrangement as claimed in claim 1, wherein an alternating electric signal from the signal source has a waveform which is substantially symmetrical relative to a zero point.

3. A circuit arrangement as claimed in claim 2, characterized by a signal source which impresses an alernating current on the semiconductor element and a measuring device which detects the voltage produced across the semiconductor element as a result of the impressed alternating current.

4. A circuit arrangement as claimed in claim 2, characterized by a signal source which impresses an alternating voltage on the semiconductor element and a measuring device which detects the current in the semiconductor element as a result of said voltage.

5. A circuit arrangement as claimed in claim 2, characterized in that the semiconductor element is connected in series with a capacitance and the signal source is connected to said series circuit, the measuring device being connected in parallel with the capacitance.

6. A circuit arrangement as claimed in claim 1, characterized by a signal source which impresses an alternating current on the semiconductor element and a measuring device which detects the voltage produced across the semiconductor element as a result of the impressed alternating current.

7. A circuit arrangement as claimed in claim 1, characterized by a signal source which impresses an alternating voltage on the semiconductor element and a measuring device which detects the current in the semiconductor element as a result of said voltage.

8. A circuit arrangement as claimed in claim 1, characterized in that the semiconductor element is connected in series circuit with a capacitance and the signal source is connected to said series circuit, the measuring device being connected in parallel with the capacitance.

9. A circuit arrangement for measuring temperature comprising: a semiconductor element exhibiting a temperature-dependent conductivity characteristic and having a planar electrode on one side and a point-shaped electrode on the opposite side wherein the conductivity above a threshold temperature is dependent on the direction of current flow in the semiconductor element between said electrodes, means for applying an AC electric signal to the electrodes of the semiconductor element, and a measuring device coupled to the semiconductor element for determining the difference in the semiconductor conductivity as a function of the polarity of the AC signal applied to the electrodes of the semiconductor element thereby to provide an indication of the temperature to be measured.

10. A circuit as claimed in claim 9 wherein the amplitude of said AC signal is adjustable so as to adjust the current level in the semiconductor element thereby to adjust the sensitivity of the circuit and/or the temperature measurement range thereof.

11. A circuit as claimed in claim 9 further comprising an impedance element connected in series circuit with the semiconductor element to said AC signal applying means, and wherein the measuring device is connected in parallel with the impedance element.

12. A circuit as claimed in claim 11 wherein the impedance element comprises a capacitor which develops thereacross a DC voltage component determined by the difference in conductivity of the semiconductor element for opposite directions of current flow therein, and the measuring device comprises a voltage measuring device that indicates said DC voltage component developed across the capacitor.

13. A circuit as claimed in claim 9 wherein the signal applying means includes a source of AC signal the amplitude of which is sufficient to drive the semiconductor element into its intrinsic conduction region for the range of temperatures to be measured.

14. A circuit as claimed in claim 13 wherein the AC signal exhibits a symmetrical waveform above and below a reference level.

15. A circuit as claimed in claim 9 wherein the AC signal is a sinusoidal voltage.

16. A circuit as claimed in claim 9 wherein the semiconductor element comprises a semiconductor material with a doping concentration in the range of $10^{13}$ to $10^{16}$ doping atoms/cm$^3$.

17. A circuit as claimed in claim 16 wherein the semiconductor material is N-doped silicon.

18. A circuit as claimed in claim 9 including means for setting the amplitude of AC signal applied to the semiconductor element to a level such as to drive the semiconductor element into its intrinsic conduction region for at least a part of the temperature range to be measured.

19. A method of measuring temperature using, as a temperature sensing element, a temperature-dependent semiconductor element having a planar electrode on one surface thereof and a smaller electrode on an opposite surface whereby the internal resistance of the semiconductor element varies as a function of the temperature thereof and, above a threshold temperature, as a function of the direction of current flow therein, said method comprising: applying an AC signal to said electrodes of the semiconductor element while it is subject to the temperature to be measured, and deriving a signal indicative of the difference in the internal resistance of the semiconductor element for opposite directions of current flow therein produced by the AC signal thereby to provide an indication of the temperature of the semiconductor element.

20. A method as claimed in claim 19 further comprising: setting the level of current flow in the semiconductor element so that it operates in its intrinsic conduction region at least in a part of the temperature range to be measured.

21. A method of measuring temperature comprising: placing a temperature-dependent semiconductor element at a location temperature is to be measured, said semiconductor element having first and second opposed electrodes of different size such that it exhibits a variation in internal resistance as a function of temperature said semiconductor element having a threshold temperature above which its internal resistance is determined by the direction of current flow therein, applying an AC signal to said electrodes of the semiconductor element, and measuring the difference in the semiconductor conductivity as a function of the polarity of the applied AC signal thereby to provide an indication of the temperature being measured.

22. A method as claimed in claim 21 comprising the further step of adjusting the level of current flow in the semiconductor element so as to vary the threshold temperature of the semiconductor element to adjust the temperature measurement range and/or the sensitivity of the measurement.

23. A method as claimed in claim 21 wherein the semiconductor element is placed at a location with temperatures above the threshold temperature so that the semiconductor element then operates in its intrinsic conduction range.

24. A method as claimed in claim 21 further comprising the step of adjusting the level of current flow in the semiconductor element so that it operates in its intrinsic conduction region in the temperature range to be measured.

* * * * *